Figure 3:
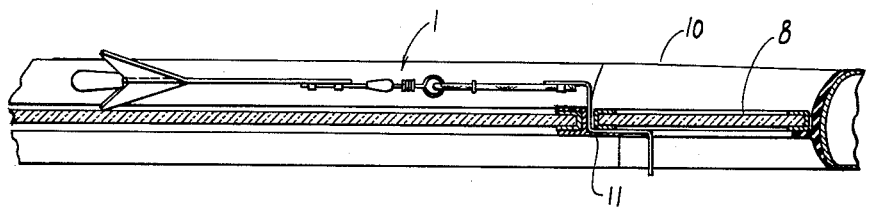

Sept. 5, 1961  E. W. PLACEK  2,998,799
ANTI-HYPNOTIC APPARATUS
Filed July 6, 1960

INVENTOR.
EUGENE W. PLACEK
BY Bosworth, Sessions,
Herrstrom & Knowles
ATTORNEYS.

United States Patent Office 2,998,799
Patented Sept. 5, 1961

2,998,799
ANTI-HYPNOTIC APPARATUS
Eugene W. Placek, Cleveland, Ohio, assignor to Genie Products Company, Cleveland, Ohio, a partnership
Filed July 6, 1960, Ser. No. 41,073
7 Claims. (Cl. 116—28)

This invention relates to anti-hypnotice apparatus and more particularly to anti-hypnotic apparatus for use on automobiles, trucks and other motor vehicles for overcoming the audio and visual monotony and consequent sommolence and hypnosis caused by steady, uninterrupted high speed travel on modern turnpikes, throughways and highways.

The advent of the modern turnpike, throughway or high speed highway wherein automobiles, trucks and other motor vehicles travel long distances at high speed without interruption due to traffic signals, cross traffic, hills, curves, or other normal impedimentia to vehicular travel has increased the incidence and danger from somnolence and autohypnosis. This hypnosis results from the fact that the usual highway sounds, such as the purr of the engine, hum of the tires, and even the vehicle radio are constant, monotonous and lack completely the variety and irregularity which accompanies city and prior normal driving and so have a soporific effect on the driver.

In addition the driver is subjected to visual monotony causing or tending to cause hypnosis as his eyes are or tend to be focused at a single point a fixed distance ahead of the vehicle as there is no danger, necessity or opportunity to observe cross traffic, oncoming traffic, traffic signals, pedestrians or any event which might arise to the side of an ordinary highway or road and which if it arose could require a reaction on the part of the driver. The visual monotony is further increased by the rapidly passing and unchanging landscape, traffic lanes, shoulder strips, road markers, and the unchanging instrument panel within. This also tends to induce hypnosis. Thus both audio and visual conditions consequent upon modern highway travel do or tend to induce hypnosis in drivers, especially those travelling alone, and many accidents and near accidents have resulted as a consequence of continued or long continued travel under these modern conditions.

Such hypnosis cannot be effectively counteracted by the driver himself either by singing, talking to himself, playing the radio loudly etc. Further the art has not provided an economical, practical device for automatically relieving both visual and audio monotony and protecting against the resultant somnolence and hypnosis; all without interfering with normal operation of the vehicle or the normal range of the driver's audio and visual reception.

The general object of this invention is, therefore, to provide a new, improved, economical and efficient apparatus for effectively overcoming somnolence and hypnosis or tendencies thereto due to the monotony of continuous high speed travel on modern highways.

A further object of this invention is to provide anti-hypnotic apparatus, for use with automobiles, trucks and other motor vehicles, which is easily and economically manufactured and easily and economically used; which causes a distractive noise to break the otherwise monotonous highway sounds yet itself never produces a regular pattern of noise which can become monotonous; which provides an irregular visual pattern to cause the eye to focus and refocus and break the monotony of the normal high speed road pattern of traffic lanes, shoulder strips, road markers, vehicle instruments etc., yet does not interfere with normal road vision and does not itself acquire a monotonous repetitive visual pattern; which is installed an removed, at will, without any deletrious effect on the vehicle, its body or surface; which is quickly and detachably installed and detached; which may be installed an detached from within the vehicle while the same is in operation, if desired; and, which is non-functional at low speeds so as not to provide unnecessary distractions in those situations where hypnosis is not likely to arise because of the variety and irregularity of the traffic pattern to both audio and visual organs.

A still further object of this invention is to provide an anti-hypnotic device for automobiles, trucks, and other motor vehicles which provides irregular audio and vidio patterns to break up and alleviate the otherwise monotonous audio and visual patterns to which the driver is subjected in modern high speed highway travel; which does not distract the driver so as to interfere with the normal care and attention which must and should be directed to operation of the vehicle; which does not interfere with the operation of the vehicle or any of the normal and usual accessories carried thereon; and, which provides unpredictable vidio and audio patterns to cause sufficient attention to be directed to itself to prevent the driver from falling or tending to fall into a hypnotic state or somnolence.

A still further object of this invention is to provide an anti-hypnotic device for automobiles, trucks and other motor vehicles which obtains one or more of the objects hereinbefore set forth.

Figure 2:
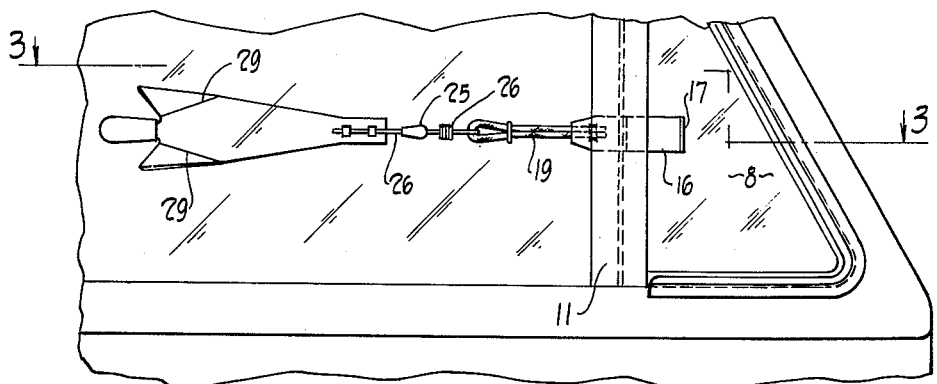
Figure 1:
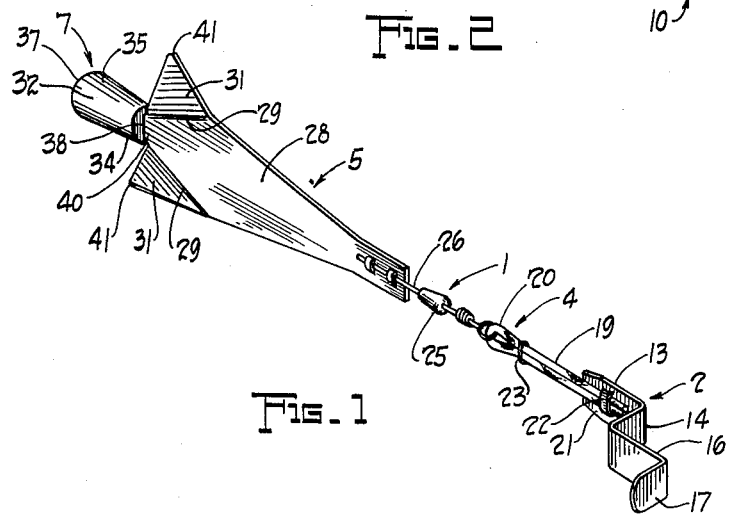

These and other objects and advantages of this invention will appear from the following description of a preferred embodiment thereof reference being had to the drawings in which:

FIGURE 1 is a perspective view of anti-hypnotic apparatus embodying a preferred form of this invention;

FIGURE 2 is a broken elevation showing apparatus embodying a preferred form of this invention as it might appear installed on a typical vehicle travelling at a speed sufficient to actuate the apparatus, the parts of the vehicle being shown on a smaller scale than the anti-hypnotic apparatus for purposes of better illustrating the apparatus and the apparatus being viewed from the interior of the automobile through the adjacent window pane; and, FIGURE 3 is a section viewed along the line 3—3 of FIGURE 2.

Broadly, the anti-hypnotic apparatus embodying a preferred form of this invention is detachably secured to the exterior of the vehicle. The apparatus includes a flexible portion and a more remote body or tail portion, which is activated by the wind, passing air currents, jars and jolts delivered to the vehicle and other stimuli, to cause the tail portion to move, in view of its flexible connection with the vehicle, in an irregular and erratic pattern relative to and against the vehicle. The apparatus thus produces both an irregular and unpredictable sound pattern against the vehicle and an irregular and unpredictable visual flight or flutter pattern for the apparatus body adjacent the vehicle and visible to the driver.

More particularly apparatus embodying a preferred form of this invention is indicated generally at 1 in FIGURE 1. The apparatus is adapted to be supported at eye level on an automobile, truck, or other motor vehicle so that it is disposed adjacent to and outside of the side window of the vehicle adjacent the driver and thereby to flutter about visible to the driver and to contact and impact the window to produce sounds or noise audible to the driver.

Preferably and conveniently the apparatus is supported in position by engagement between the ventilator window usually provided in such vehicles and the adjacent post or main window, as the case may be, see FIGURES 2 and 3, thereby precluding the necessity to drill, mar, or otherwise damage the body, finish, or surface of the vehicle upon which it is installed. Further the apparatus is preferably so sized and constructed that it cannot come in contact with the surface of the vehicle to scratch or mar the same but remains laterally outwardly of the window, which it is incapable of damaging, whether it be extended, as shown, or otherwise positioned by the actuation stimuli or be in an at rest position and drooped downwardly under the influence of gravity.

As best seen in FIGURE 1, apparatus 1 includes an attachment portion, indicated generally at 2, an intermediate or flexible portion, indicated generally at 4, a tail or body portion, indicated generally at 5, and a contact or knocker portion, indicated generally at 7.

Attachment portion 2 is preferably adapted to detachably mount the apparatus 1 upon the vehicle and to this end is preferably adapted to extend between the ventilator window 8 of the vehicle 10, and the adjacent post or main side window 11, as the case may be, of the vehicle. Attachment portion 2 is preferably a unitary structure comprising an exterior vertically flat longitudinally extending portion 13 to which the flexible portion 4 of the apparatus is attached, a transversely extending portion 14, which is of sufficient length to extend between the ventilator 8 and the adjacent post or window 11, an interior longitudinally extending portion 16, which also may extend between the ventilator 8 and post 11 and is adapted to rest or bear upon the interior of the ventilator window in order to properly position the apparatus 1 relative to the vehicle and together with portion 14 forms an L-shaped member for properly seating the apparatus.

Attachment portion 2, also, preferably includes a handle portion 17, which extends transversely into the vehicle and away from the ventilator window sufficiently to provide means by which the operator may grasp the apparatus with one hand while opening the ventilator window with the other in order to detach and/or install the apparatus as the case may be. Attachment portion 2 is preferably positioned vertically so as to be substantially at the eye level of the driver and so that the apparatus will not conact the painted surface of the vehicle either when at rest or in operation and is preferably formed of aluminum or other light-weight material.

The flexible portion 4 of apparatus 1 is adapted to provide a flexible, swiveling connection between attachment portion 2 and tail portion 5 so that tail portion 5 has substantially universal movement relative to and independently of attachment portion 2. To this end flexible portion 4 conveniently comprises a length of cord or other suitable flexible material 19, which is doubled to form a loop 20 remote from attachment portion 2. Cord 19 is secured to exterior portion 13 of attachment 2 by any suitable means such as clamps 22. Clamps 22 are punched out of the exterior portion 13 in a conventional manner, with one end remaining integral with the exterior portion, and are then bent over the cord to hold it in place. In order to ensure that the tail portion 5 tends to extend longitudinally behind the attachment portion 2 loop 20 preferably is confined in size and location by a fasting device 23 circumscribing the cord 19.

To further ensure that tail portion 5 has substantially universal movement relative to attachment portion 2, flexible portion 4, also, preferably includes a swivel 25, of the type normally used in fishing apparatus, which is secured to cord 19 by loop 20 and has a rearwardly extending wire 26 by which tail portion 5 is secured to flexible portion 4, preferably in substantially the same manner that cord 19 is secured to portion 13.

Tail portion 5 preferably comprises a truncated, triangular body 28 the remote corners of which are bent in opposite directions, as at 29, to form a pair of oppositely disposed and extending fins 31 upon which wind, passing air currents, and other stimuli can act to give random motion to tail portion 5. Tail portion 5 is preferably formed from aluminum or other light-weight metal so that it is easily activated by the wind and passing air currents and, in view of the flexible and universal means 4 by which tail portion 5 is attached to the attachment portion 2, has random, erratic, fluttering and irregular pattern of flight, tapping and scraping against the window and bending and twisting so as to extend rearwardly and angularly upwardly, downwardly and outwardly from the attachment portion thereby providing irregular visual and audio patterns. The patterns are changed by the changing wind and current flow resulting from natural causes or changes of vehicle speed and by jars and jolts received from the roadway and transferred through the vehicle to the apparatus.

In order to provide more effective audio patterns contact or knocker portion 7 is, as indicated above, preferably provided at the remote end of tail portion 5. Knocker portion 7 preferably comprises a substantially solid hard rubber member 32 preferably of truncated, conical shape having its largest diameter intermediate its length, as at 35, its narrowest diameter 34 adjacent body 28 and a rounded end 37. Knocker 7 is preferably mounted on tail portion 5 by means of an internal slot or socket 38, which frictionally engages over and upon a rearwardly extending finger 40 provided, for this purpose, on tail portion 5.

Preferably fins 31 are of such length and are so bent that the lateral displacement of the ends or tips 41 of the fins 31 relative to the plane of the tail body 25 is less than the radius of the maximum diameter 35 of the knocker 7 so as to tend to ensure that engagement between the window and apparatus 1 is by means of knocker 7.

In use the apparatus 1 is mounted in the manner described above and when the vehicle is at rest or at low speeds the flexible portion permits the apparatus to hang angularly downwardly under the influence of gravity. However when the vehicle comes up to a predetermined speed, at or approaching highway speeds commonly experienced on modern high speed throughways, tollways and similar roads the wind and passing currents act upon the fins and bumps and jars are transmitted through the vehicle to the apparatus to cause the tail portion 5 and associated knocker 7 to have an irregular and unpredictable path scraping, and tapping against the window and fluttering upwardly, downwardly, rearwardly, and outwardly under the said stimuli in an unpredictable and unrepeating pattern. The irregular sounds and flight produced provide both audio and visual relief, in the manner herein described, to the otherwise monotonous audio and visual effects produced by modern high speed travel and so prevent and tend to prevent hynosis or hypnotic somnolence.

It is preferred, by way of example, that tail portion 5 be about 3½" long, exclusive of the finger 40; that body 25 have a width at the forward ends of bends 29 of 1¼" and at the rearward ends of bends 29 of ⅜"; that bends 29 to 1" long; that the tips 41 of fins 31 be displaced laterally from the plane of tail body 25 about ¼" and rearwardly from the rearward ends of bends 29 about 3/16"; that knocker 7 have a maximum diameter of about ⅝" and a length of ⅞"; that the distance between the forward end of tail body 25 and the rearward end of portion 13 be 3"; and, that the length of portion 13 of attachment portion 2, including a gently curved juncture with portion 14 be 1½".

Modifications, changes and improvements to the above described and illustrated preferred form and embodiment of this invention may occur to those skilled in the art, who come to understand the principle and precept thereof, without separating from the spirit and substance of the invention. Accordingly it is desired that the scope of the patent obtained hereon not be limited to the form and embodiment of the invention herein particularly described and set forth but only consistent with the advance by which the invention has promoted the art.

I claim:
1. Anti-hypnotic apparatus for automobiles, trucks and other motor vehicles having a ventilator window and a rearwardly adjacent post against which the window closes, said apparatus comprising an attachment portion, a flexible connecting portion, a tail portion and a knocker portion, said attachment portion having a vertically flat, longitudinally extending exterior portion, an L shaped intermediate portion adapted to fit between said ventilator window and post, and a transversely extending handle portion adapted to extend away from said ventilator window into said vehicle, said flexible portion comprising a cord fixedly secured to and extending rearwardly from said exterior portion of said attachment portion and a swivel secured to the rearward end of said cord and having a rearwardly extending wire to which said tail portion is fixedly secured, said tail portion comprising a flat, lightweight body, said body having a truncated triangular shape with ends remote from said flexible portion, said ends being bent relative to said body and forming fins whereby said apparatus is actuated by wind, air currents and other stimuli to have random, irregular flight patterns, said knocker portion being secured to the rearward end of said body and comprising a truncated conical member of hard rubber having a rounded end, the maximum radius of said knocker being greater than the greatest distance by which any portion of said fins is displaced from the plane of said body.

2. Anti-hypnotic apparatus for automobiles, trucks and other motor vehicles having a ventilator window and a rearwardly adjacent post against which the window closes, said apparatus comprising an attachment portion, a flexible portion, a tail portion and a knocker portion, said attachment portion having a longitudinally extending exterior portion and an L shaped intermediate portion adapted to fit between said ventilator window and post, said flexible portion comprising a cord fixedly secured to and extending rearwardly from said exterior portion of said attachment portion and a swivel secured to the rearward end of said cord and having a rearwardly extending wire to which said tail portion is fixedly secured, said tail portion comprising a flat, lightweight body, said body having a truncated triangular shape with ends remote from said flexible portion, said ends being bent relative to said body and forming fins whereby said apparatus is actuated by wind, air currents and other simuli to have random, irregular flight patterns, said knocker portions being secured to the rearward end of said body and comprising a hard rubber member having a maximum radius greater than the greatest distance by which any portion of said fins is displaced from the plane of said body.

3. Anti-hypnotic apparatus for automobiles, trucks and other motor vehicles having a ventilator window and a rearwardly adjacent post against which the window closes, said apparatus comprising an attachment portion, a flexible portion, a tail portion and a knocker portion, said attachment portion having an exterior portion and an intermediate portion adapted to fit between said ventilator window and post to hold said apparatus in position, said flexible portion comprising cord means secured to said exterior portion of said attachment portion, swivel means secured to said cord means and said tail portion being secured to said swivel means, said tail portion comprising a body, of truncated triangular shape and having ends remote from said flexible portion, said ends being bent relative to said body and forming fins whereby said apparatus is acuated by wind, air currents and other stimuli to have random, irregular flight patterns, said knocker portion being secured to said body and comprising a hard rubber member.

4. Anti-hypnotic apparatus for automobiles, trucks and other motor vehicles having a ventilator window and a rearwardly adjacent post against which the window closes said apparatus comprising an attachment portion, a flexible portion, a tail portion and a knocker portion, said attachment portion having an exterior portion and a second portion adapted to fit between said ventilator window and post to hold said apparatus in position, said flexible portion being secured to said exterior portion and comprising cord means and swivel means, said tail portion being secured to said flexible portion and comprising a body portion of said body being bent or displaced relative to other portions of said body to form fins whereby said apparatus is actuated by wind, air currents and other stimuli to have random, irregular flight patterns, said knocker portion being secured to said body and being adapted to engage said vehicle to produce irregular sound patterns.

5. Anti-hypnotic apparatus for automobiles, trucks and other motor vehicles, said apparatus comprising a flexible portion, a tail portion, a knocker portion and means for attaching said flexible portion to a vehicle, said flexible portion comprising cord means and swivel means, said tail portion being secured to said flexible portion and comprising a body and fins extending from and angularly related with said body, whereby said apparatus is actuated by wind, air currents and other stimuli to have random, irregular flight patterns, said knocker portion being secured to said body and being adapted to impact said vehicle in an irregular pattern.

6. Anti-hypnotic apparatus for automobiles, trucks and other motor vehicles, said apparatus comprising a flexible portion, a tail portion and means attaching said flexible portion to a vehicle, said tail portion being attached to said flexible portion and comprising body means and fin means extending from said body means, whereby said tail portion is actuated by wind, air currents and other stimuli to have random, irregular flight patterns and impacts said vehicle in an irregular pattern.

7. Anti-hypnotic apparatus for automobiles, trucks and other motor vehicles having a driver, said apparatus comprising first means disposed exteriorly of a said vehicle and second means flexibly attaching said first means to said vehicle in the audio and visual range of the driver, said first means having fin means responsive to wind, air currents and other stimuli to impart random, irregular flight patterns to said first means and to cause said first means to impact said vehicle in an irregular pattern whereby to produce unpredictable, irregular and non-repetitive audio and visual patterns for protecting the driver against road hypnosis from otherwise monotonous audio and visual stimuli.

References Cited in the file of this patent

UNITED STATES PATENTS 2,854,942   Ross _____ Oct. 7, 1958